US011540243B2

(12) United States Patent
Sridharan et al.

(10) Patent No.: US 11,540,243 B2
(45) Date of Patent: Dec. 27, 2022

(54) OPTIMIZING TERMINATING ACCESS DOMAIN SELECTION FOR A 5G SA INTERWORKING DEVICE WITH LEGACY NETWORK

(71) Applicant: T-Mobile USA, Inc., Bellevue, WA (US)

(72) Inventors: Srinivasan Sridharan, Bellevue, WA (US); Karthik Chandrasekaran, Bellevue, WA (US); Muhilan Vamadevan, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 78 days.

(21) Appl. No.: 17/116,839

(22) Filed: Dec. 9, 2020

(65) Prior Publication Data

US 2022/0182962 A1 Jun. 9, 2022

(51) Int. Cl.
*H04W 60/00* (2009.01)
*H04W 8/24* (2009.01)
*H04W 92/02* (2009.01)

(52) U.S. Cl.
CPC ............ *H04W 60/00* (2013.01); *H04W 8/24* (2013.01); *H04W 92/02* (2013.01)

(58) Field of Classification Search
CPC ........ H04W 60/00; H04W 8/24; H04W 92/02
USPC ....................................... 455/435.1
See application file for complete search history.

(56) References Cited

U.S. PATENT DOCUMENTS

| | | | |
|---|---|---|---|
| 2019/0098547 A1* | 3/2019 | Chong | H04W 36/00 |
| 2019/0174003 A1* | 6/2019 | Chandramouli | H04W 76/16 |
| 2019/0297121 A1* | 9/2019 | Qiao | H04L 61/2007 |
| 2019/0357092 A1* | 11/2019 | Jung | H04W 36/0055 |
| 2020/0153875 A1* | 5/2020 | Karampatsis | H04L 65/1016 |
| 2020/0280511 A1* | 9/2020 | Gapin | H04L 45/302 |
| 2021/0160666 A1* | 5/2021 | Zaifuddin | H04W 8/04 |
| 2021/0314849 A1* | 10/2021 | Tiwari | H04W 60/00 |
| 2022/0240212 A1* | 7/2022 | Chun | H04W 68/12 |

* cited by examiner

*Primary Examiner* — Congvan Tran
(74) *Attorney, Agent, or Firm* — Lee & Hayes, P.C.

(57) ABSTRACT

Techniques for optimizing terminating access domain selection (TADS) flow for a Fifth Generation (5G) standalone (SA) capable interworking device with legacy Fourth Generation (4G) voice over long term evolution (VoLTE) network are discussed herein. A 5G SA capable user equipment (UE) may receive a voice call from any generation network. To receive a 5G voice call on an IP Multimedia Subsystem (IMS) network, a terminating UE must be currently connected to a 5G SA network. However, the system has to determine the currently connected radio access technology (RAT) type before establishing a connection; otherwise, attempts to establish a 5G NR connection would result in network call completion errors. The system may configure a home subscriber server to receive a TADS request for the terminating UE and return a TADS status.

19 Claims, 5 Drawing Sheets

OPTIMIZING TERMINATING ACCESS DOMAIN SELECTION FOR A 5G SA INTERWORKING DEVICE WITH LEGACY NETWORK

BACKGROUND

Modern telecommunication systems include heterogeneous mixtures of second, third, fourth, and fifth generation (2G, 3G, 4G, 5G) cellular wireless access technologies, which may be cross-compatible and may operate collectively to provide communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies. Previous 5G NR launches used existing legacy 4G LTE infrastructure in Non-Standalone (NSA) mode, but the next generation system (5GS) is transitioning to use 5G Core (5GC) infrastructure in Standalone (SA) mode.

To take advantage of the multigenerational mix of wireless communication technologies, devices configured for telecommunications are capable of communicating, not only via various types of communication applications but also via various types of networks. These interworking devices enable connectivity between old and new network elements to support the legacy infrastructure and systems while building out the next-generation networks.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques for optimizing terminating access domain selection (TADS) flow for a 5G Standalone (SA) capable interworking device with a legacy network are discussed herein. The 5G SA capable interworking device includes a user equipment (UE) capable of supporting both the legacy network and next-generation network. The UE capable of supporting 5G functions may include a 5G enabled SIM profile, and the SIM profile is associated with a with 5G SA subscriber. For instance, a cellphone having a SIM card with a SIM profile that enables 5G features, and the cellphone user has a subscription with a cellular carrier that provides 5G SA network and services. The legacy network may include a 4G voice over long term evolution (VoLTE) network and/or any previous generation network. The present system may check if a terminating UE is connected to a 5G network that supports voice over NR (VoNR) before attempting to connect a network call. VoNR is supported only the terminating UE is connected to an IP Multimedia Subsystem (IMS) core. By performing the check before attempting to connect the network call, the system avoids unnecessary signal routing.

In some examples, the system may configure a home subscriber server ("subscriber server") to maintain a subscriber database for subscription-related information to support call flow. The subscriber server may receive a request from an application server (AS) for TADS associated with a 5G SA subscriber. In response to receiving the TADS request, the subscriber server may perform a series of checks to determine if the terminating UE is currently connected to a 5G SA network.

Initially, the subscriber server may check if the terminating UE is registered only on a 5G SA network on a common data repository. The subscriber server may check if an access and mobility management function (AMF) registration for the terminating UE can be found. If found, the subscriber server may determine the AMF registration includes a deregistration callback uniform resource identifier (URI) and a purged status that is not set to true. If the AMF registration cannot be found or additional checks fail, then the subscriber server may avoid performing the remainder checks and respond to the application server with a negative TADS status.

If the terminating UE is registered, the subscriber server may check whether the subscriber profile includes support for 5G IMS. The subscriber server may check if the AMF registration indicates support for IMS voice over Packet-Switched session (IMS VoPS). If IMS VoPS is supported, then the subscriber server may respond with an affirmative TADS status with a radio access technology (RAT) type indicating NR. Otherwise, the subscriber server may check if the subscription profile includes a voice-centric data network name (DNN) provisioning and a session management function (SMF) registration and respond with the TADS status accordingly.

As described herein, to take advantage of the 5G SA wireless communication technologies, UE configured for voice calls must be capable of communicating, not only via a 5G capable communication client, but the UE must also be connected to a 5G IP multimedia subsystem (IMS) core. For instance, if a caller ("originating UE") wishes to establish a voice or video communication over the 5G network with a dialed party ("terminating UE"), the terminating UE must be a 5G SA subscriber, and the subscriber must be currently registered on 5G SA domain. Additionally, the network needs to determine whether the terminating UE is currently connected to a 5G IMS network before connecting the two UEs; otherwise a call completion error will occur. Accordingly, determining the terminating access domain selection before establishing a connection may reduce the chances of network call completion errors.

The systems and methods described herein can be used to select or otherwise determine, at a base station (e.g., the LTE base station and/or an NR base station) or at a network device, whether the terminating UE is using a 5G SA connection or a legacy LTE connection for call completion. As noted above, if the terminating UE is not a 5G SA subscriber or is not connected to a 5G IMS network, the operations can refrain from attempting to initiate a 5G voice call and waiting for call completion error before scaling down to use the legacy network. This optimizes signal flow and improves communication logic because 5G SA calls can be downgraded quickly without waiting for failed connections; thus, network signaling time and customer experience are improved. Moreover, by allowing the network to determine the capabilities of the terminating UE before call completion, the system may refrain from performing unnecessary communication session data transmission, which reduces network bandwidth usage. These and other improvements to the functioning of a computer and network are discussed herein.

In some examples, the techniques discussed herein can be implemented in the context of protocols associated with one or more of 3G, 4G, 4G LTE, 5G protocols. In some examples, the network implementations can support stand-alone architectures, non-standalone architectures, dual connectivity, carrier aggregation, etc. Example implementations are provided below with reference to the following figures.

Figure 1:
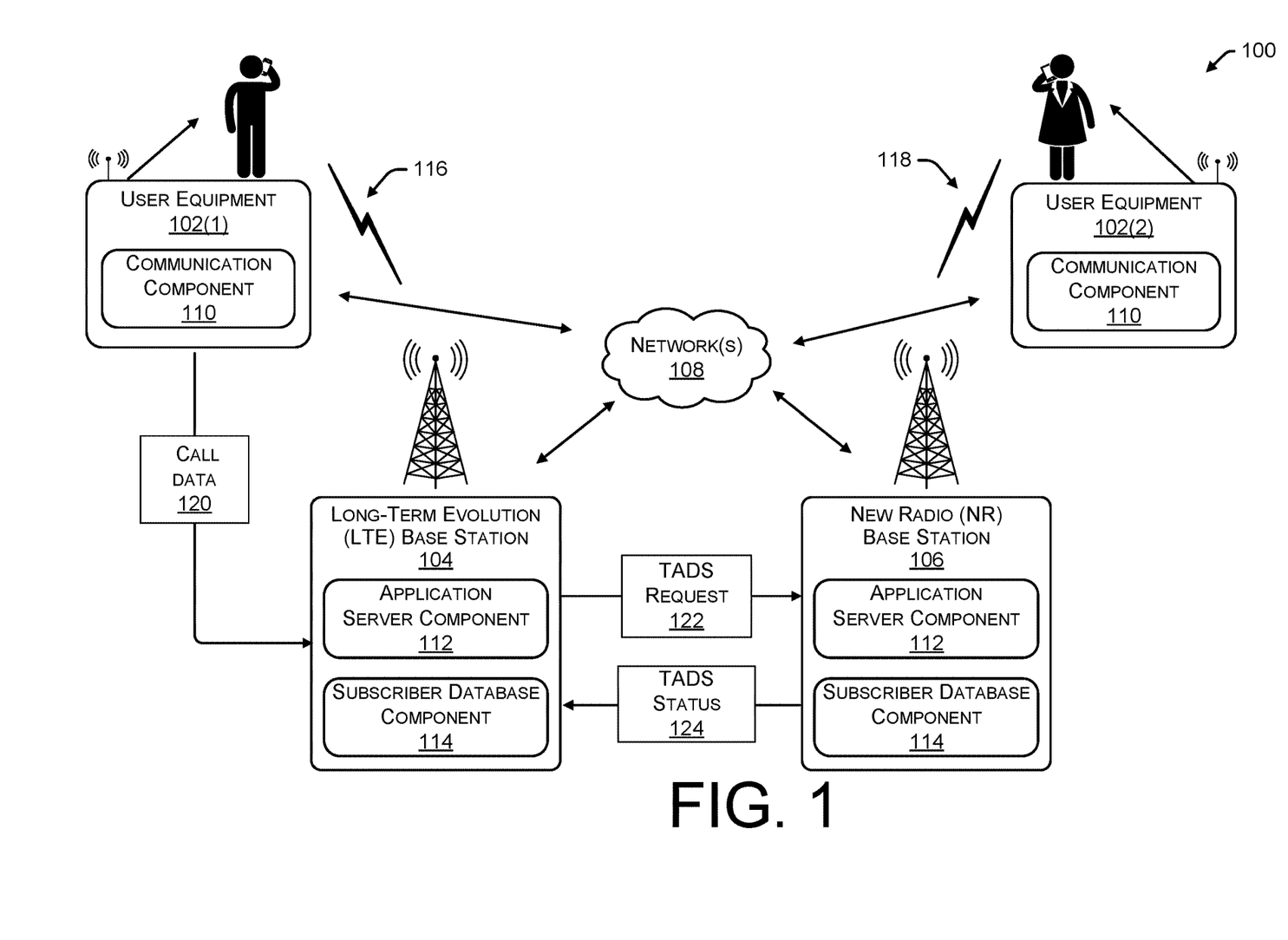
FIG. 1 illustrates an example system including user equipment and a telecommunication network configured to optimize terminating access domain selection (TADS) flow.

FIG. 1 illustrates an example system 100 including user equipment and telecommunication network configured to optimize terminating access domain selection (TADS) flow.

The user equipment 102(1) and user equipment 102(2) (collectively referred to as UE 102) can communicatively connect with other devices, including devices associated with long-term evolution (LTE) base station 104 and new radio (NR) base station 106, via the one or more network(s) 108. In an example, the example system 100 shows an originating UE 102(1) can connect to terminating UE 102(2) via a telecommunication network to engage in communication sessions for voice calls, video calls, messaging, data transfers, and/or any other type of communication. The UE 102 can be any interworking device that can connect and communicate between the next-generation network (e.g., 5G SA) and the legacy network (e.g., 4G LTE). In some examples, the UE 102 can be a mobile phone, such as a smartphone or other cellular phone. In other examples, the UE 102 can be a personal digital assistant (PDA), a media player, a tablet computer, a gaming device, a smartwatch, a hotspot, a personal computer (PC) such as a laptop, desktop, or workstation, or any other type of computing or communication device.

The UE 102 may include a communication component 110. In some examples, the communication component 110 may configure a communication client to support voice and/or video communications. In some examples, the UE 102 may initiate voice communication using the communication client to transmit session data, including identification information for caller and recipient.

The communication component 110 may send a subscribe request to poll the capabilities of a terminating UE, as described herein. In response to sending the subscribe request to the network, the communication component 110 may receive the capability set for the terminating UE. The communication component 110 may apply the capability set when communicating with the terminating UE. Based on the capability set, the communication component 110 may change the types of communication and the scale the quality and resolution of media files, videos, and/or multimedia messages used in the communication. If the capability set indicates the terminating UE is not configured to support voice over 5G, the communication component 110 may determine to downgrade the service while still allowing a communication connection. In some examples, if the capability set indicates the terminating UE is not 5G capable, the system may avoid performing TADS requests.

In some examples, the UE 102 can wirelessly connect to one or more base stations or other access points of the access networks, and in turn, be connected to the network(s) 108 via the base stations (e.g., LTE base station 104 and the NR base station 106) or other access points. In some examples, the network(s) 108 can be a packet core network of an LTE network, which may be referred to as an Evolved Packet Core (EPC). In other examples, the network(s) 108 can be a 5G core network.

The LTE base station 104 and the NR base station 106 can include an application server component 112 and a subscriber database component 114. In some instances, the LTE base station 104 and the NR base station 106 can include implementing one or more communication servers to facilitate communications by and between the various devices in the system 100. That is, the LTE base station 104 and the NR base station 106 can represent any computing devices implementing various aspects of one or more of second, third, fourth generation, and fifth generation (2G, 3G, 4G, and 5G) cellular wireless access technologies, which may be cross-compatible and may operate collectively to provide data communication services.

Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies. Thus, the LTE base station 104 and the NR base station 106 may implement GSM, UMTS, LTE/LTE Advanced, and/or NR telecommunications technologies.

In some instances, telecommunication technologies can be referred to generally as radio access technology. Thus, a 5G network can represent 5G radio access technology. The LTE base station 104 and NR base station 106 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user equipment 102, the LTE base station 104, the NR base station 106, and/or the network(s) 108. In some embodiments, the LTE base station 104 and the NR base station 106 may be operated by one or more service providers.

The application server component 112 may include functions to process calls and/or determine call logic. In various examples, the application server component 112 may include calling features like call forwarding, voicemail, and conference bridges. In some examples, the application server component 112 may provide additional multimedia features and can include features like multimedia messaging, video calling, and the integration of multiple devices to a subscriber account. The application server component 112 may perform functions that are not directly related to the routing of communication data through the network but rather determine the signal flow. In some examples, before initiating a communication session and/or generating the communication session instance, the application server component 112 may send a TADS request for a terminating UE to determine whether the terminating UE is connected to a supported network. In various examples, the application server component 112 may use Sh Diameter Interface, or any application protocol, as the interface to communicate with other network components. The application server component 112 may receive the TADS status and the radio access technology (RAT) type for the terminating UE.

The subscriber database component 114 may configure a database for containing subscription-related information to support the network. The subscriber database component 114 can collect data associated with subscribers, subscriber sessions, and/or registrations in a database. In various examples, the subscriber database component 114 may utilize a common data repository, a shared database providing support for 2G/3G/4G/5G core, to store subscriber related data, including subscriber information. The subscriber database component 114 may collect and store information specific to the subscriber accounts and subscription, including one or more of: authorized user(s), username(s), account identifier, subscription, services, and the like. The subscriber database component 114 can also collect information specific to one or more UEs associated with a subscriber account, including a device type, a device identifier, communications capabilities, and the like. The subscriber database component 114 may receive information from the UE including one or more of: Subscriber Identity Module (SIM), SIM profile, Mobile Station International Subscriber Directory Number (MSISDN), an International Mobile Subscriber Identity (IMSI), International Mobile Equipment Identity (IMEI), and the like.

The subscriber database component 114 may poll a UE to determine the communication capabilities of the UE. In some examples, the subscriber database component 114 may poll the UE based on receiving a subscribe request for the recipient UE. In response to the poll, the subscriber database component 114 may receive, from the UE, the communication capabilities of the UE based on the associated communication client and/or SIM profile. For instance, the subscriber database component 114 may send a poll to the UE to check the communication capabilities based on the calling features enabled by the current software and device firmware. In response to receiving the communication capabilities, the subscriber database component 114 may update any stored information associated with the UE and/or send a notify response with the communication capabilities to the requesting UE.

The subscriber database component 114 may handle TADS requests. In some examples, the subscriber database component 114 may receive a TADS request. In response to receiving the TADS request, the subscriber database component 114 may perform a series of checks to determine if the terminating UE is currently connected to a supported network (e.g., 5G SA network).

In the present example, the subscriber database component 114 may determine if the terminating UE is registered only on a 5G SA network on the common data repository. The subscriber database component 114 may determine if an access and mobility management function (AMF) registration for the terminating UE can be found in the common data repository. If found, the subscriber database component 114 may determine the AMF registration includes a deregistration callback uniform resource identifier (URI) and a purged status that is not set to true. If the AMF registration cannot be found or additional checks fail, then the subscriber database component 114 may avoid performing the remainder checks and respond to the application server with a negative TADS status.

In an additional example, the subscriber database component 114 may transmit a response with the TADS status.

If the terminating UE is registered, the subscriber database component 114 may determine whether the subscriber profile includes support for 5G IMS. The subscriber database component 114 may determine if the AMF registration indicates support for IMS voice over Packet-Switched session (IMS VoPS). If IMS VoPS is supported (e.g., the AMF registration has "HOMOGENEOUS SUPPORT" for VoPS), then the subscriber database component 114 may respond with an affirmative TADS status with a radio access technology (RAT) type indicating NR. Otherwise, the subscriber database component 114 may determine if the subscription profile indicates a voice-centric data network name (DNN) provisioning and if the terminating UE is registered on a session management function (SMF) node, and respond with the TADS status accordingly. If the AMF registration includes the SMF registration and the voice-centric DNN provisioning, the subscriber database component 114 may respond with an affirmative TADS status with a radio access technology (RAT) type indicating NR. Otherwise, the subscriber database component 114 may respond with a negative TADS status.

While FIG. 1 illustrates the network(s) 108, it is understood in the context of this document that the techniques discussed herein may also be implemented in other networking technologies, such as nodes that are part of a wide area network (WAN), metropolitan area network (MAN), local area network (LAN), neighborhood area network (NAN), personal area network (PAN), or the like. Examples of the network(s) 108 can include but are not limited to networks including second-generation (2G), third-generation (3G), fourth-generation (4G) cellular networks, such as LTE (Long Term Evolution), fifth-generation (5G) networks, and data networks, such as Wi-Fi networks.

In some instances, the user equipment 102 can communicate with any number of user equipment, user devices, servers, network devices, computing devices, and the like.

As a non-limiting example, the example system 100 can illustrate an example process to optimize terminating access domain selection (TADS) flow for a 5G SA capable interworking UE with legacy 4G voice over long term evolution (VoLTE) network. For example, an example caller UE 102(1) may attempt to initiate a voice call to an example terminating UE 102(2) over an example telecommunication network that includes an example 4G LTE base station 104 and an example 5G NR base station 106.

In the present example, the example caller UE 102(1) is being served by the example 4G LTE base station 104 and is connected to the network via an example LTE connection 116. The example terminating UE 102(2) is being served by the example 5G NR base station 106 and is connected to the network via an example NR connection 118. In this example, the network wants to provide the best 5G experience for the example terminating UE 102(2). Because voice over NR (VoNR) is supported only when the 5GS is connected to the IMS core, the network may need to determine whether the example terminating UE 102(2) is connected to a 5G SA network.

For instance, the example caller UE 102(1) may transmit example call data 120 to initiate a voice call via the example 4G LTE base station 104. The application server component 112 at the example 4G LTE base station 104 may send the example TADS request 122 to the example 5G NR base station 106. The subscriber database component 114, at the example 5GNR base station 106, may receive the TADS request. In response, the subscriber database component 114 may determine if the example terminating UE 102(2) is registered on the 5G SA domain. In the present example, the subscriber database component 114 determines that the example terminating UE 102(2) has a voice-centric data network name (DNN) provisioned and is registered on a session management function (SMF) node. The subscriber database component 114 responds with the example TADS status 126 to indicate an affirmative status and the network initiates a 5G voice call session.

Figure 2:
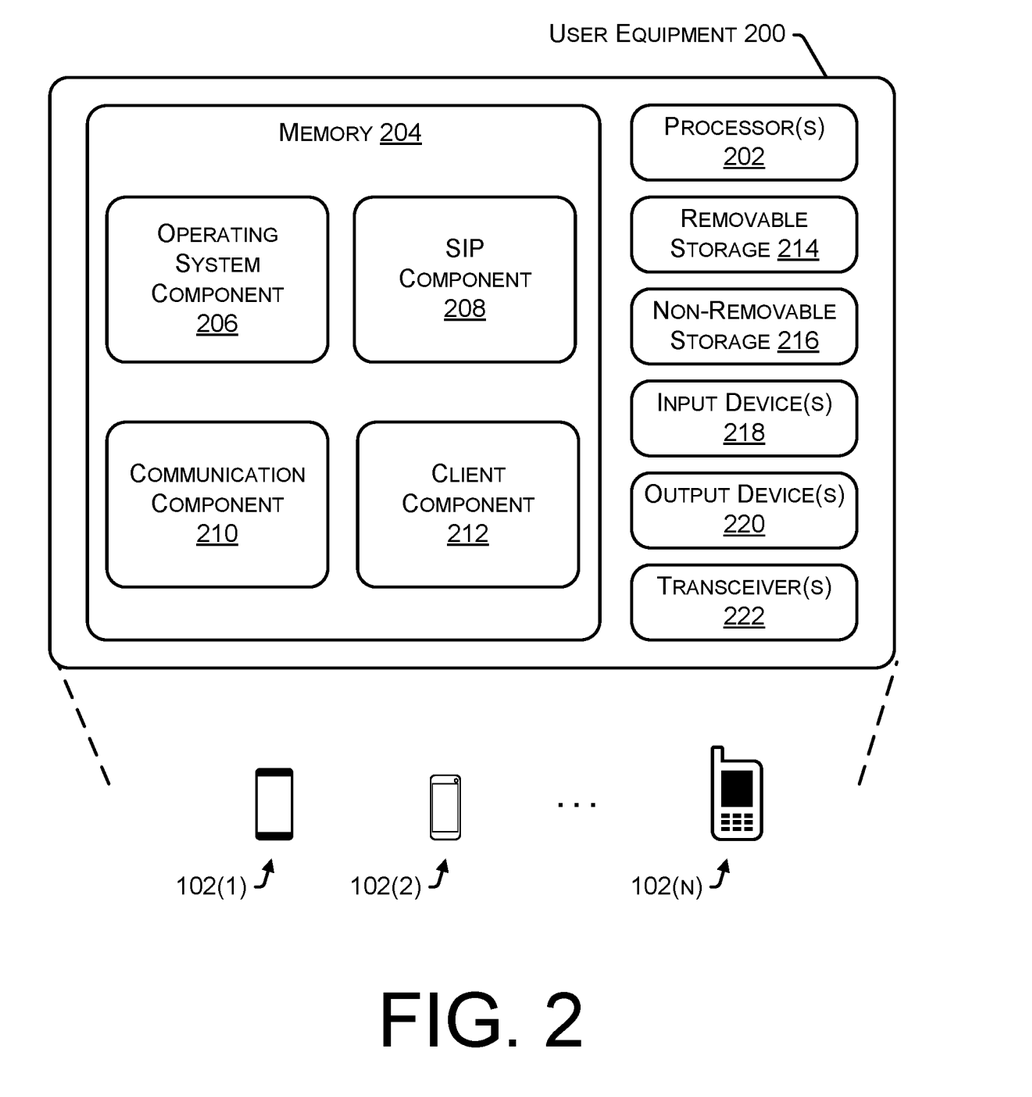
FIG. 2 is a block diagram of user equipment configured to optimize TADS flow.

FIG. 2 illustrates an example user equipment 200 configured to implement the client managing components, in accordance with embodiments of the disclosure. In some embodiments, the user equipment 200 can correspond to the user equipment 102 of FIG. 1. It is to be understood in the context of this disclosure that the user equipment 200 can be implemented as a single device or as a plurality of devices with components and data distributed among them. By way of example, and without limitation, the user equipment 200 can be implemented as various user equipment 200(1), 200(2), . . . , 200(N).

As illustrated, the user equipment 200 comprises a memory 204 storing an operating system component 206, a Session Initiation Protocol (SIP) component 208, a communication component 210, and a client component 212. Also, the user equipment 200 includes processor(s) 202, a removable storage 214 and non-removable storage 216, input device(s) 218, output device(s) 220, and transceiver(s) 222.

In various embodiments, the memory 204 is volatile (such as RAM), non-volatile (such as ROM, flash memory, etc.) or some combination of the two. The operating system component 206, the SIP component 208, the communication component 210, and the client component 212 stored in the memory 204 can comprise methods, threads, processes, applications, or any other sort of executable instructions. The operating system component 206, the SIP component 208, the communication component 210, and the client component 212 can also include files and databases.

The operating system component 206 can include functionality to identify and track the different applications installed on the user equipment 200. The operating system component 206 can include functionality to query a chipset of the user equipment 200, and/or query the transceiver(s) 222, to instruct the transceiver(s) 222 and/or any software or hardware to scan one or more channels or frequency resources to determine metrics associated with the channel or frequency resources, for example. In some instances, the operating system component 206 can include an API to receive instructions from one or more of the SIP component 208, the communication component 210, and the client component 212 and to provide data to the corresponding components, including identifying the communication clients and/or communication capabilities of the user equipment 200 and/or a serving network, and notifying the components of clients and/or capabilities. The serving network may include one or more network(s) that the user equipment 200 is currently communicatively connected to. For instance, user equipment 200 may be connected to a 5G cellular network and/or connected to a home Wi-Fi network.

The SIP component 208 may enable communications to be served using SIP instances and/or SIP messages. The SIP component 208 may transmit SIP messages containing information for identifying the user account, user equipment, and/or the communication client to serve a communication session including but not limited to: SIP instance information, access network information, Mobile Station International Subscriber Directory Number (MSISDN), International Mobile Subscriber Identity (IMSI), International Mobile Equipment Identity (IMEI) of the device, Universally Unique Identifier (UUID), called-party-address as Circuit-Switched Routing Number (CSRN), and session description protocol (SDP). The SIP component 208 may use SIP signaling and determine the current location of the user equipment 200 using a Global Positioning System (GPS).

In some examples, a phone mode may be determined based at least in part on a location (e.g., the current location) associated with user equipment. For example, if the current location of the user equipment 200 is within a geographic area in which a service provider, associated with an identifier of the user equipment 200, provides coverage, then the phone mode may be set to carrier mode. If the current location of the user equipment 200 is in a geographic area in which the service provider does not provide coverage, then the phone mode may be set to Over-The-Top (OTT) mode. In some examples, the SIP component 208 may determine, based on the phone mode not set to carrier mode, that certain carrier-specific functions may be unavailable, including, but not limited to, selecting certain types of communications or client designations. For instance, the SIP component 208 may determine the user equipment 200 is currently not in carrier mode and may not be able to use certain features of the 5G SA network.

In various examples, the SIP component 208 may transmit SIP messages with headers and/or strings to trigger specific functions and/or commands. As described herein, the SIP information may include information identifying an originating party and a terminating party. Additionally, the SIP information may include one or more commands: PUBLISH, SUBSCRIBE, NOTIFY, and the like.

The communication component 210 may determine the capability of the user equipment 200 and the serving network to determine the enabled feature information for a communication client (e.g., client component 212). As described herein, the serving network may include one or more network(s) that the user equipment 200 is currently registered to. In response to registering to a network, communication component 210 may send, to the network, a publish request to set the enabled feature information of the communication client. While the communication component 210 may send the enabled feature information to the network, it is understood in the context of this document that the user equipment 200 may send and/or receive the enabled feature information via the SIP component 208, the communication component 210, the client component 212, and/or another component. Additionally, and/or alternatively, the user equipment 200 may send the enabled feature information to the network in response to an interrogation poll rather than as a publish request.

The communication component 210 may send a subscribe request to poll the communications capabilities of a terminating UE to the network. In response to the subscribe request, the communication component 210 may receive a "NOTIFY" response, including a capability set for the terminating UE from the network. The communication component 210 may apply the capability set when communicating with the terminating UE.

The communication component 210 may include functionality to send and receive communications (e.g., voice calls, texts, instant messages, etc.) and/or determine when to transition an existing communication from one access network to another. In some examples, the communication component 210 may perform a number of functions, such as interfacing with the transceiver(s) 222, preparing the user equipment 200 to receive communications, tuning the transceiver(s) 222, receiving and processing an invitation message such as a SIP instance received via the transceiver(s) 222, and the like.

The client component 212 may configure a communication client to send and receive communications. In some examples, the client component 212 may configure some features of the communication client based on the capability set of the originating UE and the terminating UE. The client component 212 may enable or disable features of the communication client, including changing a communication type and/or scale the quality and/or resolution of videos and/or multimedia files used in the communication. For instance, an originating UE may use 5G SA features; however, if the communication component 210 determines the terminating UE only have 4G features enabled, the client component 212 may disable some of the 5G specific features in the client component 212.

The client component 212 may trigger a poll for the capabilities of a recipient client on a terminating UE, as described herein. The client component 212 may call the communication component 210 to transmit a subscribe request to poll the capabilities of the communication client of a terminating UE. In response to the poll, the communication component 210 may receive the capability set for the recipient client. The client component 212 may apply the capability set when communicating with the terminating UE. Based on the capability set, the client component 212 may change a communication type and scale the quality and resolution of videos and/or multimedia data used in the communication. If the capability set indicates the terminating UE not configured to use 5G SA IMS and/or compatible voice and/or video protocol that is able to perform the caller verification process, the communication component 210 may determine to complete the voice communication as a legacy network call.

In various examples, the client component 212 may generate a user interface to send and receive communication data. The client component 212 may be configured to send and receive communication for one or more subscriber accounts (e.g., personal cellphone, work cellphone, etc.). The client component 212 may be configured to use a particular account of the one or more subscriber accounts to originate a communication with.

In some embodiments, the processor(s) 202 is a central processing unit (CPU), a graphics processing unit (GPU), or both CPU and GPU, or other processing unit or component known in the art.

The user equipment 200 also includes additional data storage devices (removable and/or non-removable) such as, for example, magnetic disks, optical disks, or tape. Such additional storage is illustrated in FIG. 2 by removable storage 214 and non-removable storage 216. Tangible computer-readable media can include volatile and non-volatile, removable and non-removable media implemented in any method or technology for storage of information, such as computer-readable instructions, data structures, program modules, or other data. Memory 204, removable storage 214, and non-removable storage 216 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user equipment 200. Any such tangible computer-readable media can be part of the user equipment 200.

In various embodiments, the user equipment 200 can include applications including but are not limited, a web browser application, a video streaming application, an online gaming application, a network analyzer, and the like. During execution on the user equipment 200, each of the applications may be configured to cause the user equipment 200 to initiate communications with a network device (e.g., device 300) over the network(s) 108.

The user equipment 200 may be configured to communicate over a telecommunications network using any common wireless and/or wired network access technology. Moreover, the user equipment 200 may be configured to run any compatible device operating system (OS), including but not limited to, Microsoft Windows Mobile, Google Android, Apple iOS, Linux Mobile, as well as any other common mobile device OS.

The user equipment 200 also can include input device(s) 218, such as a keypad, a cursor control, a touch-sensitive display, voice input device, etc., and output device(s) 220 such as a display, speakers, printers, etc. These devices are well known in the art and need not be discussed at length here.

As illustrated in FIG. 2, the user equipment 200 also includes one or more wired or wireless transceiver(s) 222. For example, the transceiver(s) 222 can include a network interface card (NIC), a network adapter, a LAN adapter, or a physical, virtual, or logical address to connect to the various network(s) 108, or to the network device (e.g., device 300), for example. To increase throughput when exchanging wireless data, the transceiver(s) 222 can utilize multiple-input/multiple-output (MIMO) technology. The transceiver(s) 222 can comprise any sort of wireless transceivers capable of engaging in wireless, radio frequency (RF) communication. The transceiver(s) 222 can also include other wireless modems, such as a modem for engaging in Wi-Fi, WiMax, Bluetooth, infrared communication, and the like.

Figure 3:
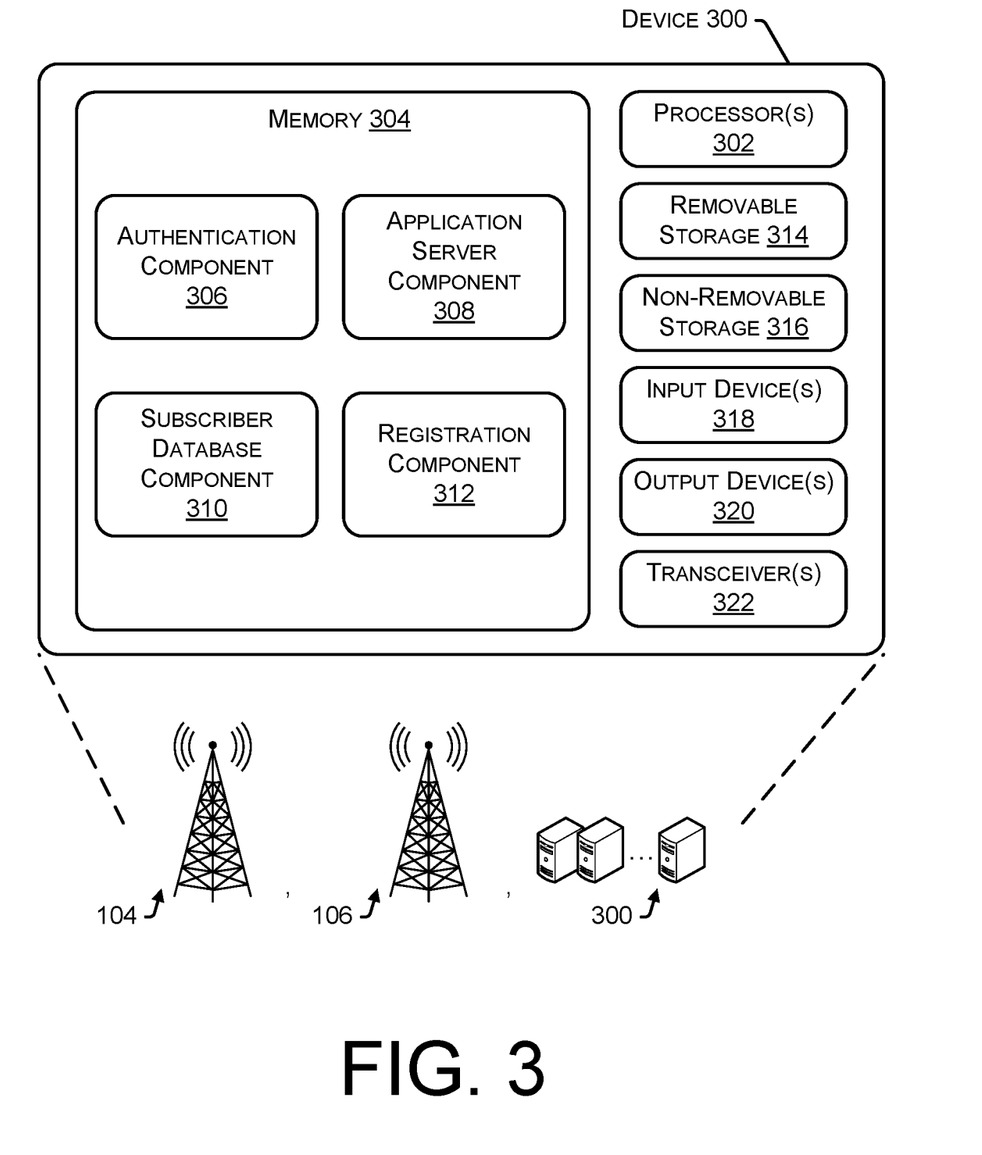
FIG. 3 is a block diagram of a device configured to optimize TADS flow.

FIG. 3 is a block diagram of a device 300 configured to optimize TADS flow. In some examples, the device 300 can be configured to implement the techniques discussed herein.

FIG. 3 shows only basic, high-level components of the device 300. Generally, the device 300 may comprise and/or may be implemented in any of various network components discussed herein, including those components illustrated in FIG. 1. For example, the device 300 may be implemented in the LTE base station 104, the NR base station 106, the network(s) 108, or other network devices.

In various examples, the device 300 may include processor(s) 302 and memory 304. Depending on the exact configuration and type of computing device, the memory 304 may be volatile (such as RAM), non-volatile (such as ROM, flash memory, etc.) or some combination of the two. The memory 304 may include an authentication component 306, an application server component 308, a subscriber database component 310, and a registration component 312.

The authentication component 306 can include functionality to identify and/or authenticate UEs, user devices, network devices, and/or any other communications components to interact with the network. The authentication component 306 may receive requests to initiate the UE. The authentication component 306 may authorize the UE to connect to the network by determining that the UE is associated with a 5G SA subscription. The authentication component 306 may grant authorization for the services that the UE is allowed to access based on subscription data (e.g., roaming restrictions, access type, and RAT type currently in use) is evaluated once the UE is successfully identified and authenticated. This authorization may be executed during a UE registration procedure.

The authentication component 306 may retrieve data from a user database, data repository, and/or any other database to verify a subscriber account and/or associated UE is authorized to use the services provided by the device 300. In some examples, the authentication component 306 may include a unified data repository (UDR). The UDR may be a common data repository of subscriber information and can be used to service network functions and/or used to determine the service available to a subscriber. The common data repository can be a shared database providing support for 2G/3G/4G/5G core and can store subscriber related data, including subscriber information.

The application server component 308 may include functions to process calls and/or determine call logic. In some instances, the application server component 308 can correspond to the application server component 112 of FIG. 1. As described herein with respect to the application server component 112, the application server component 308 may include calling features like call forwarding, voicemail, and conference bridges. In some examples, the application server component 308 may provide additional multimedia features and can include features like multimedia messaging, video calling, and the integration of multiple devices to a subscriber account. The application server component 308 may perform functions that are not directly related to the routing of communication data through the network but rather determine the signal flow. In some examples, before initiating a communication session and/or generating the communication session instance, the application server component 308 may send a TADS request for a terminating UE to determine whether the terminating UE is connected to a supported network. In various examples, the application server component 308 may use Sh Diameter Interface, or any application protocol, as the interface to communicate with other network components. The application server component 308 may receive the TADS status and the radio access technology (RAT) type for the terminating UE.

The subscriber database component 310 can collect data associated with subscriber and/or registration in a database. In some instances, the subscriber database component 310 can correspond to the subscriber database component 114 of FIG. 1. As described herein with respect to the subscriber database component 114, the subscriber database component 310 may retrieve registration data and respond to TADS requests. The subscriber database component 310 may collect and store information specific to the subscriber accounts and subscription, including one or more of: authorized user(s), username(s), account identifier, subscription, and the like. The subscriber database component 310 can also collect information specific to one or more UEs associated with a subscriber account, including a device type, a device identifier, communications capabilities, and the like. The subscriber database component 310 may receive information from the UE including one or more of: Subscriber Identity Module (SIM), SIM profile, Mobile Station International Subscriber Directory Number (MSISDN), an International Mobile Subscriber Identity (IMSI), International Mobile Equipment Identity (IMEI), and the like.

In some examples, the subscriber database component 310 may receive a TADS request and respond with a TADS status. The subscriber database component 310 may receive the TADS request from an application server serving the originating UE.

The subscriber database component 310 may receive a subscribe request to poll the capabilities of a recipient UE, as discussed herein. The subscribe request may include information to identify the originating UE and/or the recipient UE, including one or more of: account identifier, username, Mobile Station International Subscriber Directory Number (MSISDN), an International Mobile Subscriber Identity (IMSI), and the like. The subscriber database component 310 may receive a subscribe request for the recipient UE and may poll the recipient UE for communication capabilities based on the associated communication client and/or SIM profile. For instance, the subscriber database component 310 may receive the request and send a poll to the UE to check the communication capabilities based on the current software and firmware. In response to receiving the communication capabilities, the subscriber database component 310 may update any stored information associated with the UE and/or send a notify response with the communication capabilities to the originating UE.

The registration component 312 can include functionality to register a UE to use the network. In various examples, the registration component 312 may receive a request to register the UE to use the network resources. The registration component 312 may generate a registration for the UE and may receive and store a subscription profile associated with the UE.

In some examples, the processor(s) 302 is a central processing unit (CPU), a graphics processing unit (GPU), both CPU and GPU, or other processing unit or component known in the art. Furthermore, the processor(s) 302 may include any number of processors and/or processing cores. The processor(s) 302 is configured to retrieve and execute instructions from the memory 304.

The memory 304 can also be described as non-transitory computer-readable media or machine-readable storage memory and may include removable and non-removable media implemented in any method or technology for storage of information, such as computer-executable instructions, data structures, program modules, or other data.

The memory 304 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The device 300 also includes additional data storage devices (removable and/or non-removable) such as, for example, magnetic disks, optical disks, or tape. Such additional storage is illustrated in FIG. 3 by removable storage 314 and non-removable storage 316. Tangible computer-readable media can include volatile and non-volatile, removable and non-removable media implemented in any method or technology for storage of information, such as computer-readable instructions, data structures, program modules, or other data. The memory 304, the removable storage 314, and the non-removable storage 316 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 300. Any such tangible computer-readable media can be part of the device 300.

The memory 304, the removable storage 314, and/or the non-removable storage 316 may in some cases include storage media used to transfer or distribute instructions, applications, and/or data. In some cases, the memory 304, the removable storage 314, and/or the non-removable storage 316 may include data storage that is accessed remotely, such as network-attached storage that the device 300 accesses over some type of data communications network.

In various examples, any or all of the memory 304, the removable storage 314, and/or the non-removable storage 316 may store programming instructions that, when executed, implement some or all of the function functionality described herein.

The device 300 also can include input device(s) 318, such as a keypad, a cursor control, a touch-sensitive display, voice input device, etc., and output device(s) 224 such as a display, speakers, printers, etc. These devices are well known in the art and need not be discussed at length here.

As illustrated in FIG. 3, the device 300 also includes one or more wired or wireless transceiver(s) 322. For example, the transceiver(s) 322 can include a network interface card (NIC), a network adapter, a LAN adapter, or a physical, virtual, or logical address to connect to various networks, devices, or components illustrated in figures herein. To increase throughput when exchanging wireless data, the transceiver(s) 322 can utilize multiple-input/multiple-output (MIMO) technology. The transceiver(s) 322 can comprise any sort of wireless transceivers capable of engaging in wireless, radio frequency (RF) communication. The transceiver(s) 322 can also include other wireless modems, such as a modem for engaging in Wi-Fi, WiMAX, Bluetooth, infrared communication, and the like.

In some examples, the device 300 can be implemented as the base stations 104 and 106, including the application server component 112 and/or the subscriber database component 114.

Figure 4:
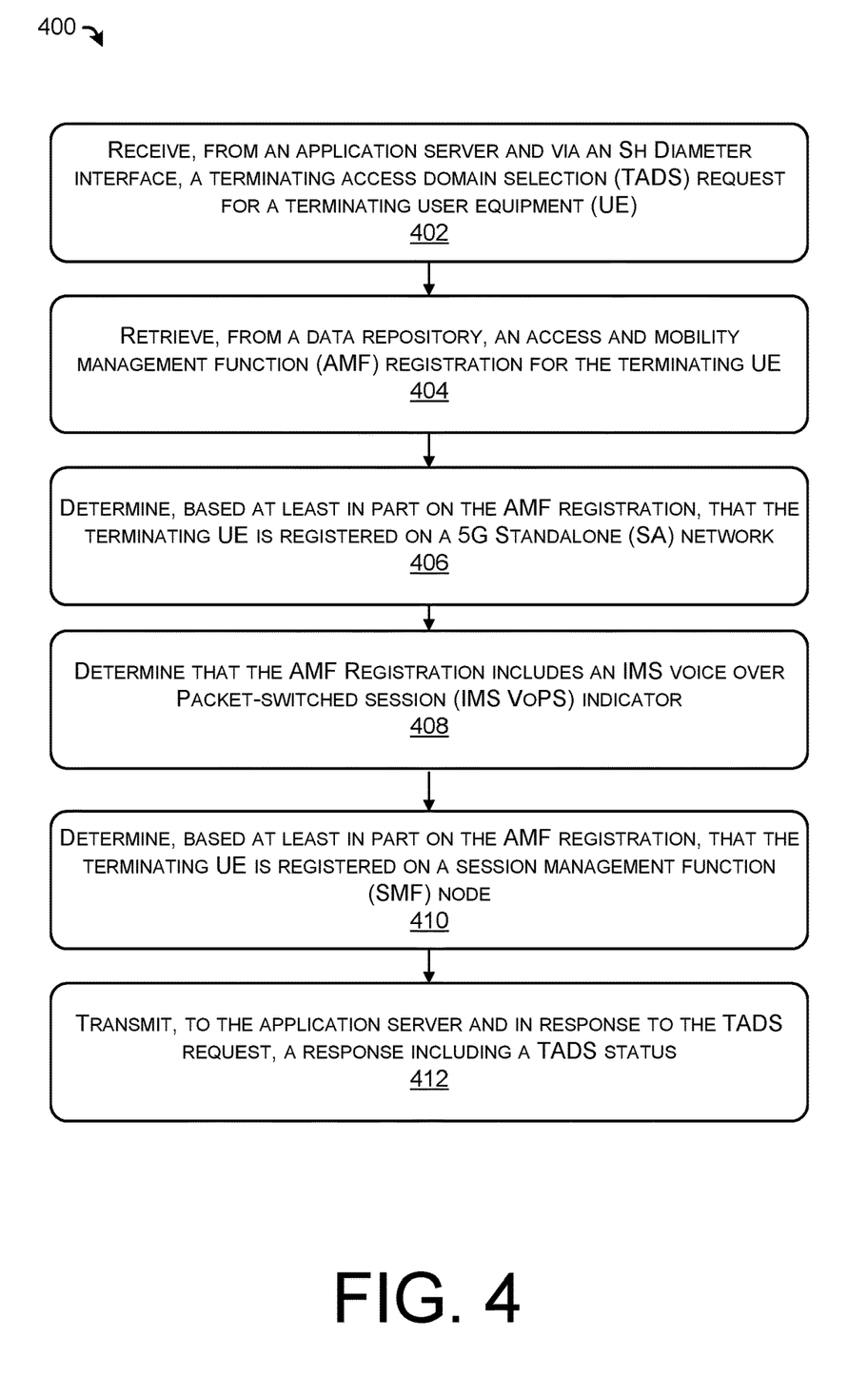
FIG. 4 illustrates an example process for optimizing TADS flow.
Figure 5:
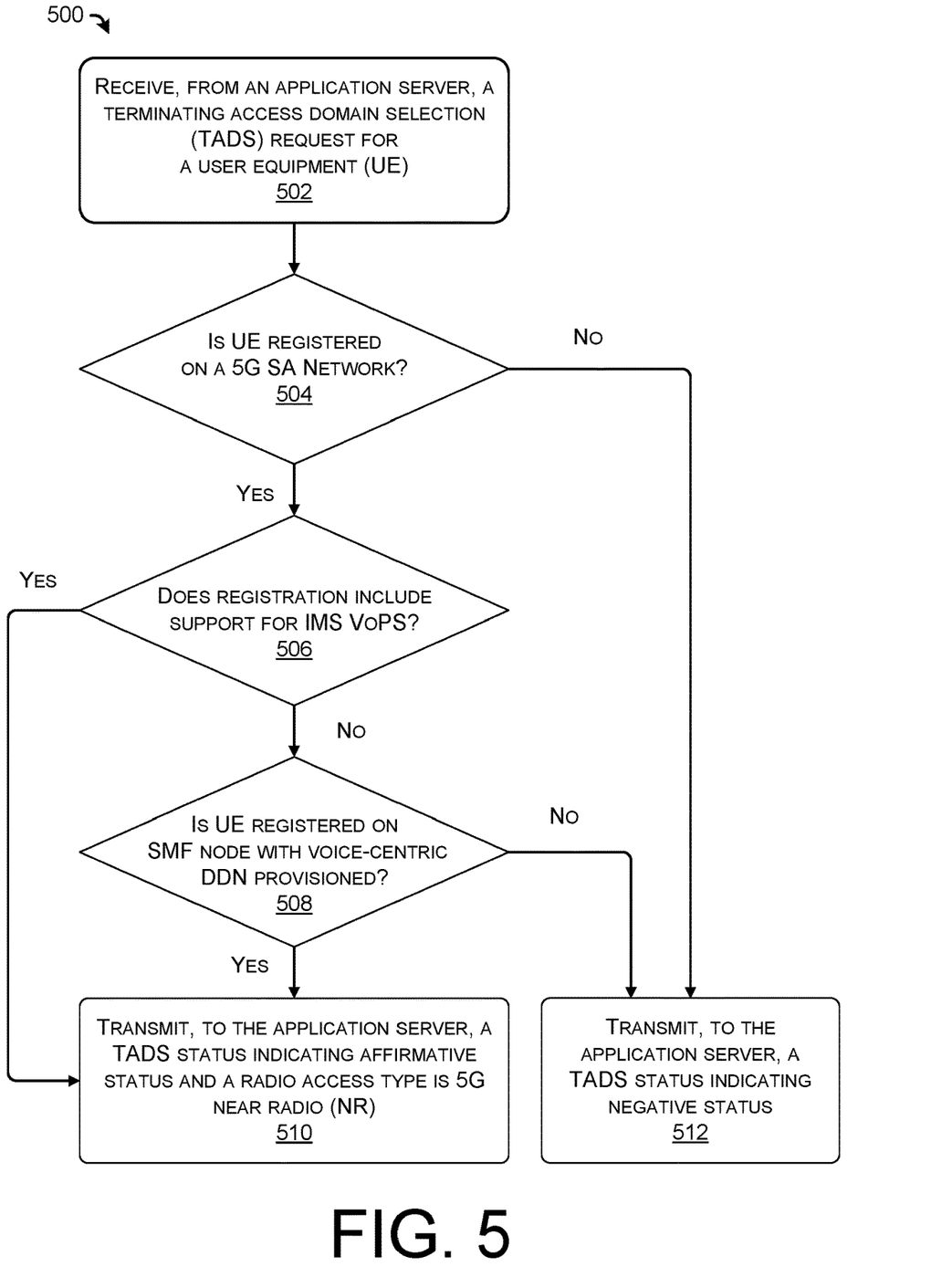
FIG. 5 illustrates another example process for optimizing TADS flow.

FIGS. 4 and 5 illustrate example processes and sequence diagrams in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

FIG. 4 illustrates an example process 400 for optimizing TADS flow. The example process 400 can be performed by the LTE base station 104, the NR base station 106, and/or by the device 300 comprising the application server component 308, the subscriber database component 310, or another component or device as discussed herein.

At operation 402, the process can include receiving, from an application server and via an Sh Diameter Interface, a terminating access domain selection (TADS) request for a terminating user equipment (UE). As described herein, before initiating a communication session and/or generating the communication session instance, the application server component may send a TADS request for a terminating UE to determine whether the terminating UE is connected to a supported network. The application server component may use Sh Diameter Interface, or any application protocol, as the interface to communicate with other network components. The subscriber database component may receive the TADS request for the terminating UE from an application server serving the originating UE.

At operation 404, the process can include retrieving, from a data repository, an access and mobility management function (AMF) registration for the terminating UE. As described herein, the subscriber database component may receive a TADS request. In response to receiving the TADS request, the subscriber database component may perform a series of checks to determine if the terminating UE is currently connected to a supported network (e.g., 5G SA network). In the various examples, the subscriber database component may determine if the terminating UE is registered only on a 5G SA network on the common data repository. The subscriber database component may determine if an access and mobility management function (AMF) registration for the terminating UE can be found in the common data repository.

At operation 406, the process can include determining, based at least in part on the AMF registration, that the terminating UE is registered on a 5G Standalone (SA) network. As described herein, the subscriber database component may determine if the terminating UE is registered only on a 5G SA network on the common data repository. The subscriber database component may determine if an access and mobility management function (AMF) registration for the terminating UE can be found in the common data repository. If found, the subscriber database component may determine the AMF registration includes a deregistration callback uniform resource identifier (URI) and a purged status that is not set to true.

At operation 408, the process can include determining that the AMF registration includes an IMS voice over Packet-Switched session (IMS VoPS) indicator. As described herein, the subscriber database component may determine if the AMF registration indicates support for IMS voice over Packet-Switched session (IMS VoPS). If IMS VoPS is supported (e.g., the AMF registration has "HOMOGENEOUS SUPPORT" for VoPS), then the subscriber database component may respond with an affirmative TADS status with a radio access technology (RAT) type indicating NR.

At operation 410, the process can include determining, based at least in part on the AMF registration, that the terminating UE is registered on a session management function (SMF) node. As described herein, the subscriber database component may determine if the subscription profile indicates a voice-centric data network name (DNN) provisioning and if the terminating UE is registered on a session management function (SMF) node and respond with the TADS status accordingly. If the AMF registration includes the SMF registration and the voice-centric DNN provisioning, the subscriber database component may respond with an affirmative TADS status with a radio access technology (RAT) type indicating NR.

At operation 412, the process can include transmitting, to the application server and in response to the TADS request, a response including a TADS status. As described herein, the subscriber database component may determine if the subscription profile indicates a voice-centric data network name (DNN) provisioning and if the terminating UE is registered on a session management function (SMF) node, and respond with the TADS status accordingly. If the AMF registration includes the SMF registration and the voice-centric DNN provisioning, the subscriber database component may respond with an affirmative TADS status with a radio access technology (RAT) type indicating NR. Otherwise, the subscriber database component may respond with a negative TADS status.

FIG. 5 illustrates another example process 500 for optimizing TADS flow. The example process 500 can be performed by the LTE base station 104, the NR base station 106, and/or by the device 300 comprising the subscriber database component 310, the registration component 312, or another component or device as discussed herein.

At operation 502, the process can include receiving, from an application server, a terminating access domain selection (TADS) request for a user equipment (UE). As described herein, before initiating a communication session and/or generating the communication session instance, the application server component may send a TADS request for a terminating UE to determine whether the terminating UE is connected to a supported network. The application server component may use Sh Diameter Interface, or any application protocol, as the interface to communicate with other network components. The subscriber database component may receive the TADS request for the terminating UE from an application server serving the originating UE.

At operation 504, the process can include determining whether the UE registered on a 5G SA network. As described herein, the subscriber database component may determine if the terminating UE is registered only on a 5G SA network on the common data repository. The subscriber database component may determine if an access and mobility management function (AMF) registration for the terminating UE can be found in the common data repository. If found, the subscriber database component may determine the AMF registration includes a deregistration callback uniform resource identifier (URI) and a purged status that is not set to true. If the UE is registered on a 5G SA network (e.g., "yes" in operation 504), the process can continue to operation 506. Otherwise, if the UE is not registered on a 5G SA (e.g., "no" in operation 504), the process continues to operation 512.

At operation 506, the process can include determining whether the registration includes support for IMS VoPS. As described herein, the subscriber database component may determine if the AMF registration indicates support for IMS voice over Packet-Switched session (IMS VoPS). If IMS VoPS is supported (e.g., the AMF registration has "HOMOGENEOUS SUPPORT" for VoPS), then the subscriber database component may respond with an affirmative TADS status with a radio access technology (RAT) type indicating NR. If the registration includes support for IMS VoPS (e.g., "yes" in operation 506), the process can continue to operation 510. Otherwise, if the registration does not include support for IMS VoPS (e.g., "no" in operation 506), the process continues to operation 508.

At operation 508, the process can include determining whether the UE is registered on SMF node with voice-centric DNN provisioned. As described herein, the subscriber database component may determine if the subscription profile indicates a voice-centric data network name (DNN) provisioning and if the terminating UE is registered on a session management function (SMF) node and respond with the TADS status accordingly. If the AMF registration includes the SMF registration and the voice-centric DNN provisioning, the subscriber database component may respond with an affirmative TADS status with a radio access technology (RAT) type indicating NR. If the UE is registered on an SMF node with voice-centric DNN provisioned (e.g., "yes" in operation 508), the process can continue to operation 510. Otherwise, if the UE is not registered on the SMF node or voice-centric DNN is not provisioned (e.g., "no" in operation 508), the process continues to operation 512.

At operation 510, the process can include transmitting, to the application server, a TADS status indicating affirmative status and a radio access type is 5G near radio (NR). As described herein, if the AMF registration includes the SMF registration and the voice-centric DNN provisioning, the subscriber database component may respond with an affirmative TADS status with a radio access technology (RAT) type indicating NR.

At operation 512, the process can include transmitting, to the application server, a TADS status indicating negative status. As described herein, if the AMF registration includes the SMF registration and the voice-centric DNN provisioning, the subscriber database component may respond with an affirmative TADS status with a radio access technology (RAT) type indicating NR. Otherwise, the subscriber database component may respond with a negative TADS status.

CONCLUSION

Although features and/or methodological acts are described above, it is to be understood that the appended claims are not necessarily limited to those features or acts. Rather, the features and acts described above are disclosed as example forms of implementing the claims.

What is claimed is:

1. One or more non-transitory computer-readable media storing computer executable instructions that, when executed, cause one or more processors to perform operations comprising:
   receiving, from an application server and via an Sh Diameter interface, a terminating access domain selection (TADS) request for a terminating user equipment (UE);
   retrieving, from a data repository, an access and mobility management function (AMF) registration for the terminating UE;
   determining, based at least in part on the AMF registration, that the terminating UE is registered on a 5G Standalone (SA) network;
   determining that the AMF registration includes an IP Multimedia Subsystem voice over Packet-Switched session (IMS VoPS) indicator;
   determining, based at least in part on the AMF registration, the terminating UE is registered on a session management function (SMF) node; and
   transmitting, to the application server and in response to the TADS request, a TADS status, wherein the TADS status includes one of an affirmative indicator for 5G support or a negative indicator for 5G support.

2. The one or more non-transitory computer-readable media of claim 1, wherein determining that the terminating UE is registered on the AMF registration comprises:
   determining that the AMF registration includes a deregistration callback uniform resource identifier (URI); and
   determining that the AMF registration includes a purged status not set to true.

3. The one or more non-transitory computer-readable media of claim 1, wherein determining that the terminating UE is registered on the SMF node comprises:

determining that the AMF registration includes an SMF registration; and determining that the SMF registration includes a voice-centric data network name (DNN) provisioning.

4. The one or more non-transitory computer-readable media of claim 1, wherein the TADS status includes an affirmative indicator for 5G support and a radio access technology (RAT) type indicating 5G New Radio (NR).

5. The one or more non-transitory computer-readable media of claim 1, wherein the TADS status includes a negative indicator for 5G support.

6. A method comprising:

receiving, from an application server, a terminating access domain selection (TADS) request for a terminating user equipment (UE);

determining, based at least in part on accessing a data repository, that an access and mobility management function (AMF) registration is active for the terminating UE;

determining that the AMF registration includes homogeneous support for an IP Multimedia Subsystem voice over Packet-Switched session (IMS VoPS) indicator for the terminating UE;

determining, based at least in part on the AMF registration, that the terminating UE is registered on a session management function (SMF) node; and transmitting, to the application server and based at least in part on the TADS request, a response including a TADS status.

7. The method of claim 6, wherein receiving the TADS request comprises receiving the TADS request via an Sh Diameter interface.

8. The method of claim 6, wherein receiving the TADS request comprises determining that the terminating UE is associated with a 5G Standalone (SA) subscription.

9. The method of claim 6, wherein determining that the AMF registration is active comprises:

determining that the AMF registration includes a deregistration callback uniform resource identifier (URI); and determining that the AMF registration includes a purged status not set to true.

10. The method of claim 6, wherein determining that the terminating UE is registered on the SMF node comprises:

determining that the AMF registration includes an SMF registration; and determining that the SMF registration includes a voice-centric data network name (DNN).

11. The method of claim 6, wherein the TADS status indicates an affirmative status and further comprising: setting a radio access technology (RAT) type to 5G new radio (NR).

12. The method of claim 6, wherein the TADS status indicates a negative status.

13. The method of claim 6, further comprising:

receiving, from the application server, a second TADS request for a second terminating UE;

determining that the data repository fails to include an active AMF registration for the second terminating UE; and transmitting, to the application server, a second TADS status indicating negative status.

14. A system comprising:
one or more processors;
a memory; and
one or more components stored in the memory and executable by the one or more processors to perform operations comprising:

receiving, from an application server, a terminating access domain selection (TADS) request for a terminating user equipment (UE);

retrieving, from a data repository, an access and mobility management function (AMF) registration for the terminating UE;

determining, based at least in part on the AMF registration, that the terminating UE is registered on a 5G Standalone (SA) network;

determining that the AMF registration includes voice-centric provisioning, the determining that the AMF registration includes voice-centric provisioning including either:

(A) determining that the AMF registration includes an IP Multimedia Subsystem voice over Packet-Switched session (IMS VoPS) indicator with homogeneous support, or (B) determining that the AMF registration includes an IMS VoPS indicator without homogeneous support, and determining, based at least in part on the AMF registration, that the terminating UE is registered on a session management function (SMF) node; and transmitting, to the application server, a response including an affirmative TADS status.

15. The system of claim 14, wherein determining that the terminating UE is registered on the 5G SA network comprises:

determining that the AMF registration includes a deregistration callback uniform resource identifier (URI); and determining a purged status associated with the terminating UE is not set to true.

16. The system of claim 14, wherein determining that the AMF registration includes voice-centric provisioning comprises:

determining that the TADS status includes setting a radio access technology (RAT) type to 5G New Radio (NR).

17. The system of claim 14, further comprising determining that the AMF registration does not include voice-centric provisioning, including:

determining that the AMF registration includes an IMS VoPS indicator without homogeneous support;

determining, based at least in part on the AMF registration, that the terminating UE is not registered on a SMF node; and determining that the TADS status includes a negative indicator.

18. The system of claim 14, wherein receiving the TADS request comprises pinging the terminating UE for device capability and verifying that the terminating UE is 5G Standalone (SA) subscriber.

19. The system of claim 14, the operations further comprising:

receiving, from the application server, a second TADS request for a second terminating UE;

determining that the AMF registration fails to include the second terminating UE; and transmitting, to the application server, a second TADS status indicating negative status.

* * * * *